United States Patent [19]

Blazek et al.

[11] Patent Number: 5,383,832
[45] Date of Patent: Jan. 24, 1995

[54] METHOD AND MACHINE FOR PERFORMING A TOOL CHANGE

[75] Inventors: Pavel Blazek, Schlierbach; Gerhard Stark, Notzingen, both of Germany

[73] Assignee: STAMA Mashinenfabrik, GmbH, Schlierback, Germany

[21] Appl. No.: 215,026

[22] Filed: Mar. 21, 1994

[30] Foreign Application Priority Data

Apr. 7, 1993 [DE] Germany .............. 4311469

[51] Int. Cl.⁶ .............................. B23Q 3/157
[52] U.S. Cl. .............................. 483/1; 483/55; 483/56
[58] Field of Search ............. 483/1, 30, 54, 55, 56, 483/57, 58

[56] References Cited

U.S. PATENT DOCUMENTS

| 4,119,213 | 10/1978 | Sato et al. | 483/63 X |
| 4,358,888 | 11/1982 | Zankl et al. | 483/54 |
| 4,644,635 | 2/1987 | Murai et al. | 483/54 |

FOREIGN PATENT DOCUMENTS

| 2935523C2 | 3/1982 | Germany . | |
| 3317554C2 | 4/1992 | Germany . | |
| 217241 | 12/1983 | Japan | 483/1 |
| 3166031 | 7/1991 | Japan | 483/55 |

Primary Examiner—William Briggs
Attorney, Agent, or Firm—Jones, Tullar & Cooper

[57] ABSTRACT

A method for performing a tool change in a machine tool for machining workpieces, which is provided with a table for clamping workpieces, disposed on a machine frame, with a support on which one vertical or horizontal main spindle is disposed, and with a tool magazine, wherein the tool change is performed at a first peripheral location of the tool magazine which faces the main spindle which is movable in relation to the tool magazine. To achieve the readying of a tool subsequently to be employed without double grippers and without a spread magazine, with short chip-to-chip times and with kinematics which are simplified in regard to construction and control at the same time, at least a first empty position in the tool magazine is provided which is directly adjacent to the position receiving the tool to be used next, a tool is removed from the tool magazine, that this tool is temporarily stored in the area of this second peripheral location, that the tool change is performed directly with the aid of the main spindle in such a way that the already employed tool is deposited in the first empty position of the tool magazine and the tool to be used, which is adjacent to this, is taken from the tool magazine, and that subsequently the temporarily stored tool is again deposited in the second empty location generated in this way.

9 Claims, 3 Drawing Sheets

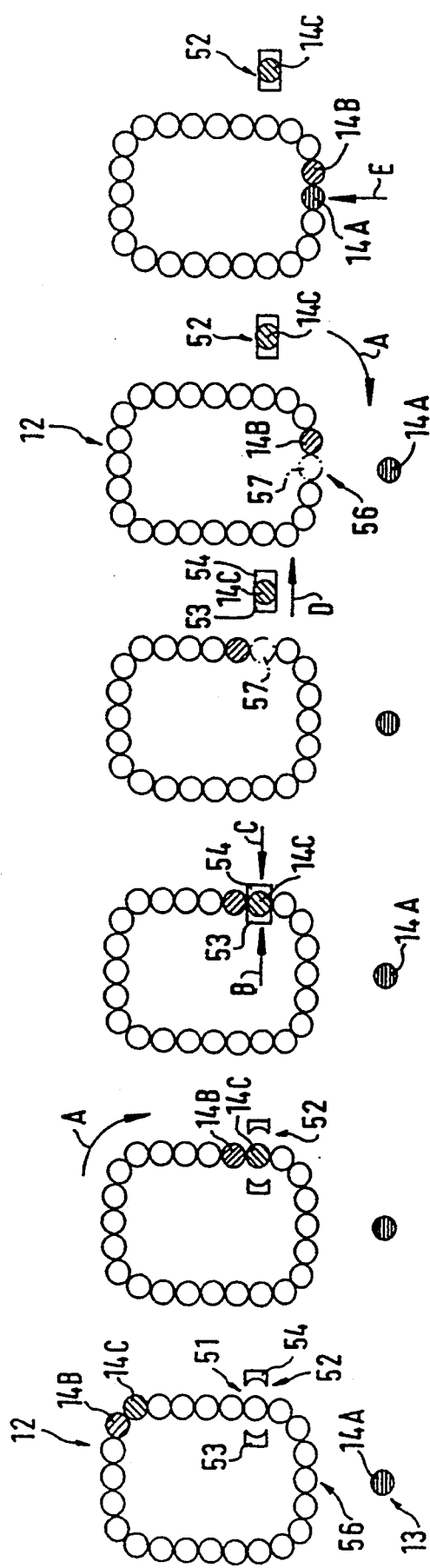
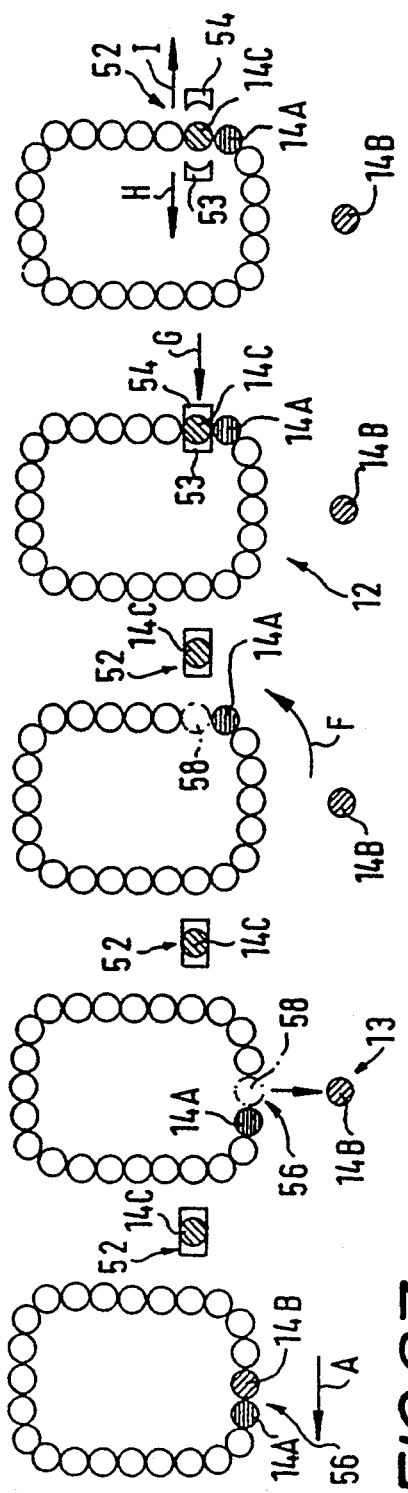

METHOD AND MACHINE FOR PERFORMING A TOOL CHANGE

FIELD OF THE INVENTION

The present invention relates to a method for performing a tool change in a machine tool and to a machine tool for machining workpieces, the machine tool being provided with a table for clamping workpieces, the table being disposed on a machine frame with a support on which at least one vertical or horizontal main spindle is disposed, and with a tool magazine, wherein the tool change is performed at a first peripheral location of the tool magazine which faces the main spindle, which spindle is movable in relation to the tool magazine.

BACKGROUND OF THE INVENTION

In a machine tool of this type, known from German Patent Publication DE 29 35 523 C2, the tool magazine per se is rotatable and is disposed at a location remote from the main spindle. A manipulator is disposed between the main spindle and the transfer position in the magazine, for example in the form of a double arm gripper, which can pick up tools with both ends, i.e. during a tool change it takes the already employed tool off the main spindle with one end and with the other end takes the next tool out of the magazine, performs a turn of, for example, 180° and places the already employed tool into the magazine and places the new next tool on the main spindle. A very rapid tool change is advantageous here, since during processing by the main spindle a search movement of the magazine can be performed in such a way that the needed successive tool is placed into the transfer position while the workpiece is being processed. In addition, the tools here are outside of the machining area, so that as a result no spoiled edges occur. However, the disadvantage here is the construction and therefore monetary outlay, because the double arm gripper must perform at least three movements which are powered electromechanically, hydraulically or in a like manner, namely a gripping and release movement with respect to the tools, a back-and-forth movement directed vertically with respect to the main spindle axis for removing and placing the tools, and a rotating movement for transferring the tools from the main spindle to the magazine and vice versa.

In a further machine tool of this type, known from German Patent Publication DE 33 17 554 C2, the tool magazine can be spread open at a place on the periphery near the main spindle, so that a tool can be moved out of the tool magazine, picked up by the main spindle and again be returned to the tool magazine in this manner. The so-called chip-to-chip time can also be kept short constantly with this known machine tool, since it is possible to move the next tool to be used into the range of the spreadable peripheral location within the tool magazine during processing by a tool.

However, with this type of a so-called pickup system it has been shown that, because of the process of spreading open the tool magazine and the extension out of and retraction into the tool magazine of the holder equipped with or to be equipped with the respective tool, the structural layout of the kinematics for spreading the tool magazine is relatively elaborate and is prone to fail, particularly in case of large magazines and/or heavy tools.

Since industry demands larger and larger magazines and more complex tools, after some prototypes had been built it has been found that spreading magazines of this type are not only too prone to fail, but are also too noisy.

OBJECT AND SUMMARY OF THE INVENTION

It is therefore an object of the present invention to provide a machine tool of the type mentioned at the outset for machining workpieces without a double gripper and without a spreading magazine, by means of which it is possible to make a tool available to be used within a chip-to-chip time which is just as short, and at the same time with kinematics which are simplified in regard to construction and control.

This object is attained by a method for performing a tool change in a machine tool and by a machine tool for machining workpieces of the type previously mentioned, in that at least a first empty position is provided for receiving the next tool to be used, with a tool is removed from the tool magazine, and this tool then being temporarily stored in the area of a second peripheral location. The tool change is performed directly with the aid of a main spindle in such a way that the already employed tool is deposited in the first empty position of the tool magazine, and the tool to be used, which is adjacent thereto is taken from the tool magazine, and, subsequently, the temporarily stored tool is again deposited in the second empty location generated in this way.

Thus, in accordance with the present invention, a gap is provided in the tool magazine in the immediate vicinity of the next tool to be used, which is used to deposit the tool just used or previously used, so that access to the next tool to be used can be provided very rapidly. The tool changing time is kept short, because the pickup and deposition of a tool by the main spindle takes place directly at the tool magazine. Because the release station in accordance with the present invention can be provided at any arbitrary place of the periphery of the tool magazine, it is possible to keep the required size of the space between the tool magazine and the operating area of the main spindle in the area of the tool changing location of the tool magazine smaller. A simple linear movement of a most simply constructed holder for the respective tool is sufficient, because the tool taken out at the release station in order to provide a gap in the tool magazine only needs to be taken out of a holder in the tool magazine. This can be realized constructively and with respect to control techniques in a very simple manner.

To be able to grasp the next tool to be used with the main spindle after the already used tool has been deposited in the tool magazine, it is for example possible to move the main spindle appropriately. However, in accordance with an exemplary embodiment of the present invention, the tool magazine is moved forward by one step between the deposition of the already employed tool and the removal of the tool to be subsequently used, the tool magazine is moved forward by one step in the appropriate direction.

Advantageous embodiments of the present invention, in particular with respect to the release station, ensue in that the tool to be temporarily stored is grasped by grippers in a release station and is maintained outside of the circulation path of the tool magazine, the clamping faces of the grippers having a shape corresponding to the receiving cone of the tools, and the clamping movement of the grippers and a simultaneous tool lifting movement is derived from the transverse movement by means of oblique surfaces.

The number of tool holders within the tool magazine can be greater by one than would correspond to the number of the tools used, or it can be the same, as is realized by the number of chain members in the tool magazine.

Further details of the invention can be taken from the subsequent description, wherein the invention will be more extensively described and explained by means of an exemplary embodiment illustrated in the drawings.

DETAILED DESCRIPTION OF THE PREFERRED EMBODIMENT

Figure 1:
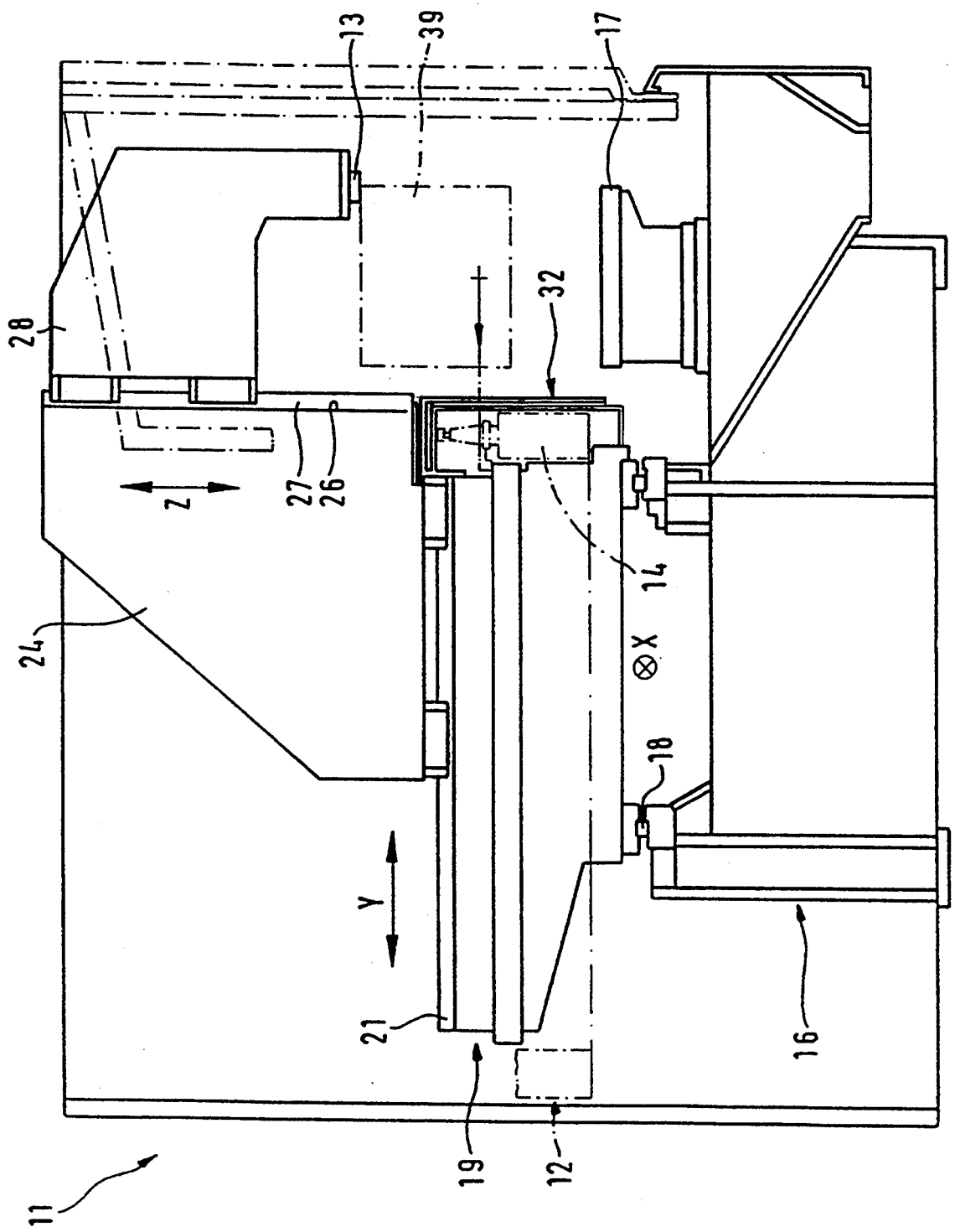
FIG. 1 is a schematic lateral view of a machine tool for machining workpieces in accordance with a preferred exemplary embodiment of the present invention, FIGS. 2.1 to 2.11 show several schematic top views of the tool magazine to illustrate the tool change, including the step of readying the tool.

The machine tool 11 shown in the drawings is used for machining workpieces, for example for drilling, thread-cutting, milling and the like. In accordance with the present invention, the machine tool 11 is provided with a tool magazine 12, so that a tool 14 can be directly picked up from the tool magazine and then again deposited by means of a tool or main spindle 13. In this way, in the so-call pickup process, the chip-to-chip time can be kept constant, and during the processing time by means of another tool 14, a tool 14 to be subsequently used is made ready in such a way that next to it a gap is made or prepared for receiving the tool 14 which is to be deposited following the process step.

With the exemplary embodiment shown, the machine tool 11 has a machine frame 16 on which, on the side facing the operator, a table 17 of conventional design is fastened for clamping workpieces, and in the area of which extending parallel thereto and facing away from the operator a first horizontal carriage guide 18 is fastened, on which a first coordinate carriage 19 can be moved in the X direction parallel to the table 17. The drive required for this is disposed inside the machine frame 16 in a manner not illustrated. Extending horizontally and vertically to the first coordinate carriage 19, also called a cross piece, is a second carriage guide 21 provided on it, along which a movable support 24 can be moved in the Y direction with the aid of a drive motor, also not shown. On its front 26 facing the table 17, the movable support 24 is provided with a vertical guide 27 for a spindle carrier 28, which rotatably supports the main spindle 13. The spindle carrier 28 can be moved up and down in the direction of the vertical Z axis with the aid of a drive motor, not shown. The main spindle 13, rotatably seated within the spindle carrier 28, is rotatingly driven by a main drive motor, not shown, fastened to the spindle carrier 28. The workpiece table 17 is either stationary or swivelable in the horizontal plane around a vertical axis, so that it is possible to clamp a workpiece on one end or side of the table while a workpiece is being processed on the other end. The main spindle 13 can be displaced along all coordinate axes X, Y and Z, which are located vertically in relation to each other.

The tool magazine 12 extends around the periphery of the cross piece 19, i.e. it surrounds the cross piece 19. The high area of the tool magazine 12 provided with tools 14 extends approximately between the underside facing the first horizontal carriage guide 18 and the top of the cross piece 19 provided with the second horizontal carriage guide 21. The tool magazine 12 has an elongated shape provided with radii. The tool magazine 12 can be embodied in the customary manner. For example, the tool magazine 12 has a plurality of fork-shaped holders, not shown in detail, which are connected with each other in the form of a chain and are guided in the area of their closed backs on a horizontal guide path so they can move around the periphery. The tool 14 can be taken out of such a fork-shaped holder by lifting it and moving it transversely, and can be placed back into it in the reverse order. It is understood that a drive element, not shown here, is provided for moving the tool magazine.

As can be seen in the FIGS. 2.1 to 2.11 in a schematic way, the tool magazine 12 is provided with a release station 52 at a location 51 along its periphery, which has two oppositely located grippers 53, 54. By means of these it is possible to grasp a tool held in one of the fork-shaped holders and to move it out of the respective holder, to hold it as long as necessary and to return it back into the holder again. The two grippers 53, 54 of the release station 51 therefore are used to keep a removed tool 14 remote from the path of the tool magazine 12 until it can be reinserted into the tool magazine 12. The location 51 along the periphery of the tool magazine 12 where the release station 52 is located is remote from the location 56 where the tool change takes place. However, in a preferred manner the release station 52 is provided close to the tool changing location 56, as can be seen in FIG. 2.

In accordance with FIGS. 2.1 to 2.11, a tool change, including readying a successive tool, takes place in the following steps:

The tool spindle 13 is equipped with a tool 14A, by means of which a workpiece, not shown here, is actually being processed (FIG. 2.1). The tool 14B intended for subsequent processing is disposed, for example, in a rear position of the tool magazine 12. During processing of the workpiece by means of the tool 14A, the tool magazine 12 is moved in the direction of the arrow A long enough so that the tool 14C, which is adjacent to the tool 14B to be subsequently used, reaches the release station 52 (FIG. 2.2). In the exemplary embodiment shown, the tool 14C is disposed in the direction of circulation A of the tool magazine 12 ahead of the tool 14B to be subsequently used. It is understood that it can also be disposed behind it. In this position the tool 14C, which is not the one to be used next, is grasped by the grippers 53 and 54 of the release station 51, and in the process the two grippers 53, 54 move toward each other in accordance with the arrows B and C (FIG. 2.3). This tool 14C, not required at this time, is removed from the tool magazine 12 with the aid of the grippers 53, 54 by being moved outward in the direction of the arrow D (FIG. 2.4). Because of this an empty position 57 is created in the tool magazine 12. The not required tool 14C is temporarily stored, held in the release station 51 by the grippers 53 and 54, outside of the path of the tool magazine 12. The tool magazine 12 is then moved further in the direction of the arrow A until the empty position 57 has reached the tool changing location 56 (FIG. 2.5). The tool 14B, to be taken up next, is located immediately next to this empty position 57. This step of readying an empty position 57 and the new tool 14B to be used next takes place during the processing step by means of the tool 14A. In general, this readying step is completed prior to the end of the processing step. Following the processing step, the tool 14A is deposited in the empty position 57 of tool magazine 12 with the aid of the main spindle 13, as shown by the arrow E (FIG. 2.6). Once the main spindle 13 is again outside of the path of the tool magazine 12, the latter is moved forward by one position in the direction of the arrow A, so that the tool 14B to be used is now disposed in the tool changing location 56 (FIG. 2.7). Then the main spindle 13 takes the fresh tool 14B out of the tool magazine 12 (FIG. 2.8), after which the tool magazine 12 is either moved on in the direction of the arrow A or, as in the illustrated exemplary embodiment, is moved back in the opposite direction in accordance with the arrow F until the current empty position 58, in which the tool 14A used up to now had been held, has reached the release station 52 (FIG. 2.9). The tool 14C, maintained in the storage position until now, is moved into this empty position 58 by movement of the grippers 53, 54 in the direction G (FIG. 2.10), and is placed into this position or holder by the movement of the grippers 53, 54 away from each other in the directions H and I (FIG. 2.11).

After this, a new search and readying movement of the tool magazine 12 for a further tool to be used starts during processing by means of the tool 14B held in the main spindle 13. With respect to control and association, the arrangement of the tool magazine 12 and individual tools 14 can be made in such a way that, for example, every tool 14 is provided with an identification to be scanned by a sensor. However, it is also possible to follow, by means of a table based on the initial association of each tool 14 to each tool magazine position, the respective change between the tool magazine position and the tool in tabular form, so that the instantaneous association or its recognition is assured with the help of an appropriate processor control.

Figure 3:
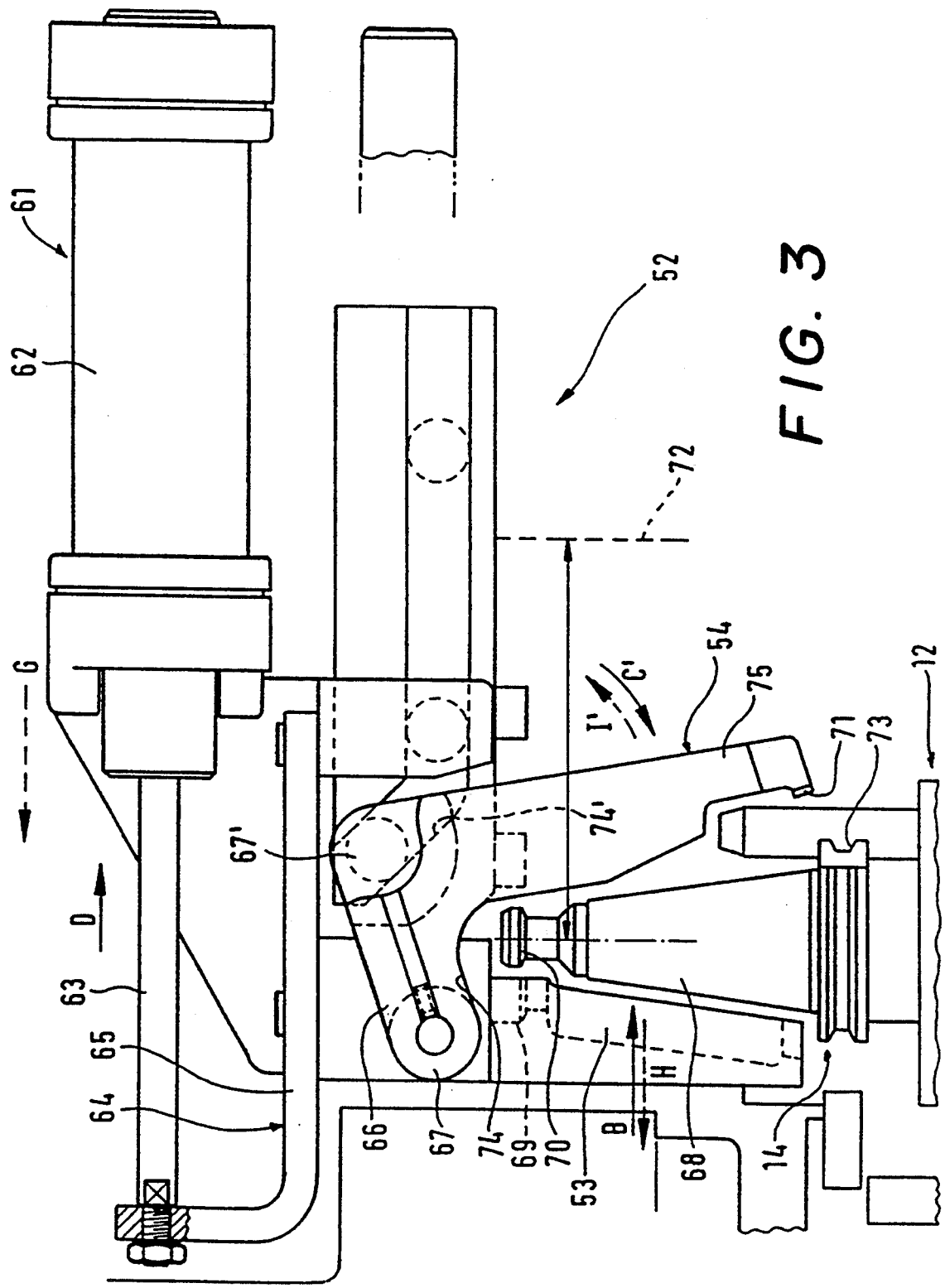
FIG. 3 shows an embodiment of the release station of the machine tool of FIG. 1 in a schematic and enlarged view.

In accordance with FIG. 3, the two grippers 53, 54 in the release station 52 can be moved toward or away from each other with the aid of a pneumatic drive 61 in the direction of the arrows B and C' or H and I', and can be displaced or moved in the direction of the arrows D and G for moving a tool 14 in and out. A stationary pneumatic cylinder 62 is provided for this, the piston rod 63 of which is fixedly connected on its free end with an L-shaped strap 64, on the long leg 65 of which the one gripper 53 is directly and rigidly maintained. The gripper 53, which is disposed obliquely corresponding to the tool clamping cone 68, can therefore be linearly moved. In contrast thereto, the other gripper 54 is pivotably maintained on the leg 65 of the L-shaped strap 64 in such a way that, when the piston rod 63 is moved in the direction of the arrow D, the arm 66 of the gripper 54 is lowered and pivoted in the direction of the arrow C' because of two cams 67 and 67' and stationary curves 74 and 74' and comes to rest against the cone 68 of the tool 14 in the same way as the gripper 53 moving linearly in the direction of the arrow B. In this way the clamping cone 68 of the tool 14 is clamped between the grippers 53 and 54. Simultaneously, the tool 14 is lifted because of two oblique formfitting surfaces 69 and 70 on the gripper 53 and the tool cone 68, so that it can be more easily removed from the fork-shaped holder. A lower form-fitting connection between a gripper arm 75 and the tool cone 68 is the result of a projection 71 on the arm 75 and a corresponding groove 73 in the tool cone 68. With a continued movement of the piston rod 63 in the direction of the arrow D, the tool 14 is moved out of the respective holder of the tool magazine to a deposit or storage location, represented by the dash-dotted line 72. It also ensues from the above that the deposition of the tool 14 in an empty position in the tool magazine takes place in the reverse manner, so that at the end of the movement of the piston rod 63 in the direction of the arrow G both grippers 53 and 54 are removed from the work cone 68 during a movement in the direction of the arrows I' and H, so that the two grippers 53 and 54 are out of the path of the tool magazine 12 or the individual cones 68 of the tools 14.

The illustrated exemplary embodiment is based on the assumption that the number of tool holders in the tool magazine 12 is equal to the number of tools 14 used in the machine tool 11. However, it is also possible to make the number of tool holders in the tool magazine greater than the number of tools to be used.

The illustrated exemplary embodiment is based on a machine tool with a single main spindle 13. It is understood that the measures of the present invention can also be employed with machine tools with two or more main spindles. In addition, this way of tool manipulation during tool changes can be used not only with the vertically disposed main spindle(s) illustrated, but also with so-called horizontal machines.

In accordance with FIG. 1, the tool magazine 12 is surrounded by a sheet metal cover 32 for protection with respect to the processing or chip chamber 39 of the machine tool 11. An L-shaped cover part is provided on the sheet metal cover 32 in a manner not shown, which permits access of the tool spindle 13 to the tool to be deposited or removed during the tool change.

What is claimed is:

1. A method for performing a tool change in a machine tool for machining workpieces, said machine tool having a main spindle and a tool magazine containing a plurality of tools which are moved relative to the main spindle, the method comprising the steps of:

imparting a peripheral motion to the tool magazine, said peripheral motion defining first and second peripheral locations of the tool magazine, said first peripheral location facing the main spindle;

removing a tool from the tool magazine at the second peripheral location, thereby defining a first empty position in the tool magazine, and temporarily storing the removed tool;

depositing the tool already used in said first empty space with the aid of said main spindle at the first peripheral location;

taking the tool to be used, adjacent to the tool deposited in said first empty position, from the tool magazine, thereby defining a second empty position; and subsequently, depositing the temporarily stored tool in the second empty position.

2. The method as defined in claim 1, wherein the tool magazine is moved forward by one step between the deposition of the tool already used and the removal of the tool to be subsequently used.

3. The method as defined in claim 1, wherein the temporarily stored tool is removed from the tool magazine by grippers, the method further comprising:

providing a release station adjacent the second peripheral location; and removing the temporarily stored tool from the tool magazine at the release station and maintaining the temporarily stored tool outside of the peripheral motion of the tool magazine.

4. A machine tool for machining of workpieces, comprising:

a machine frame;

a table disposed on said machine frame on which workpieces are clamped;

a movable support;

at least one vertically or horizontally movable main spindle disposed on said movable support;

a tool magazine disposed to follow a peripheral movement, said peripheral movement defining a first peripheral location facing said main spindle, and a second peripheral location remote from said first peripheral location, said second peripheral location defining a release station; and removing means to remove a tool from said tool magazine, wherein:

a tool is removed from said tool magazine by said removing means at said release station, thereby defining a first empty position in said tool magazine, said removed tool being temporarily stored during a tool change, the tool already being used is directly deposited, with the aid of said main spindle, in said first empty position, while the tool in said tool magazine adjacent to said first empty position is removed from the tool magazine, thereby defining a second empty position, and said temporarily stored tool is returned to said tool magazine from said release station to said second empty position.

5. The machine tool as defined in claim 4, wherein the tool magazine is moved forward by one step between the deposition of the tool already used and the removal of the tool to be subsequently used.

6. The machine tool as defined in claim 4, wherein said removing means comprise two grippers which are disposed on both sides of the peripheral path of the tool magazine, said grippers being adapted to move into a position where they clamp a tool in the tool magazine traveling in the peripheral path.

7. The machine tool as defined in claim 6, wherein the tools have receiving cones, and wherein the faces of the grippers have a shape corresponding to the receiving cones of the tools.

8. The machine tool as defined in claim 6, wherein each tool and each gripper have compatible oblique surfaces, and wherein the clamping movement of the grippers and a simultaneous tool lifting movement are derived from the compatible oblique surfaces.

9. The machine tool as defined in claim 4, wherein the number of chain members in the tool magazine is equal to the number of tools to be employed.

* * * * *